US008516518B2

(12) United States Patent
Bolyukh et al.

(10) Patent No.: US 8,516,518 B2
(45) Date of Patent: Aug. 20, 2013

(54) ADVANCE NOTICE OF TELEVISION ADVERTISEMENTS

(75) Inventors: Yuriy Bolyukh, Trophy Club, TX (US); Dolapo Kukoyi, Irving, TX (US); Armando Stettner, Westford, MA (US); Aamer Charania, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 950 days.

(21) Appl. No.: 12/570,276

(22) Filed: Sep. 30, 2009

(65) Prior Publication Data
US 2011/0078740 A1 Mar. 31, 2011

(51) Int. Cl.
*H04N 5/445* (2011.01)
*H04N 7/025* (2006.01)

(52) U.S. Cl.
USPC ............... 725/34; 725/36; 725/42; 725/43; 725/46; 725/47

(58) Field of Classification Search
USPC .................................... 725/32–36
See application file for complete search history.

(56) References Cited

U.S. PATENT DOCUMENTS

| | | | |
|---|---|---|---|
| 6,574,793 B1* | 6/2003 | Ngo et al. | 725/32 |
| 7,440,674 B2* | 10/2008 | Plotnick et al. | 386/343 |
| 2002/0129362 A1* | 9/2002 | Chang et al. | 725/32 |
| 2002/0178445 A1* | 11/2002 | Eldering et al. | 725/32 |
| 2006/0212900 A1 | 9/2006 | Ismail et al. | |
| 2006/0253330 A1 | 11/2006 | Maggio et al. | |
| 2006/0271979 A1 | 11/2006 | Hejna, Jr. | |
| 2007/0022032 A1* | 1/2007 | Anderson et al. | 705/35 |
| 2008/0115161 A1* | 5/2008 | Kurzion | 725/32 |
| 2008/0127246 A1* | 5/2008 | Sylvain | 725/32 |
| 2008/0320513 A1* | 12/2008 | Wong et al. | 725/38 |

* cited by examiner

*Primary Examiner* — Vivek Srivastava
*Assistant Examiner* — Carmine Malangone

(57) ABSTRACT

A video client receives an advertising map over a subscription multimedia network, where the advertising map includes a schedule of default advertisements during a programming break and indications of available alternate advertisements. The video client provides, for display to a user, indicators for the schedule of default advertisements and receives user input to alter the schedule of default advertisements. The video client retrieves advertising content for the altered schedule and presents, on the display and during the programming break, the advertising content for the altered schedule.

23 Claims, 10 Drawing Sheets

ADVANCE NOTICE OF TELEVISION ADVERTISEMENTS

BACKGROUND INFORMATION

As media outlets proliferate and viewing audiences become more fragmented, advertisers, such as television advertisers, are having greater difficulty capturing and holding viewer attention. Consequently, it is more critical than ever that advertisements be creative and reach beyond a traditional linear format.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that may provide viewers advance notice regarding upcoming advertising. The systems and/or methods may enable viewers to opt in or opt out of particular advertisements in advance, or in near-real time, and thereby tailor the types of advertising they view. As described further herein, indicators for advertisements may be presented to a viewer in advance of a program break period (e.g., a commercial break). The indicators may represent, for example, a default selection and sequence of upcoming advertising. The viewer may select, exchange, and/or arrange the indicators to achieve a desired advertisement sequence for the upcoming break period. In an exemplary implementation, the viewer input for the advertisement selection may be tracked and used by advertisers to identify group preferences and provide more sophisticated targeted advertising.

Figure 1:
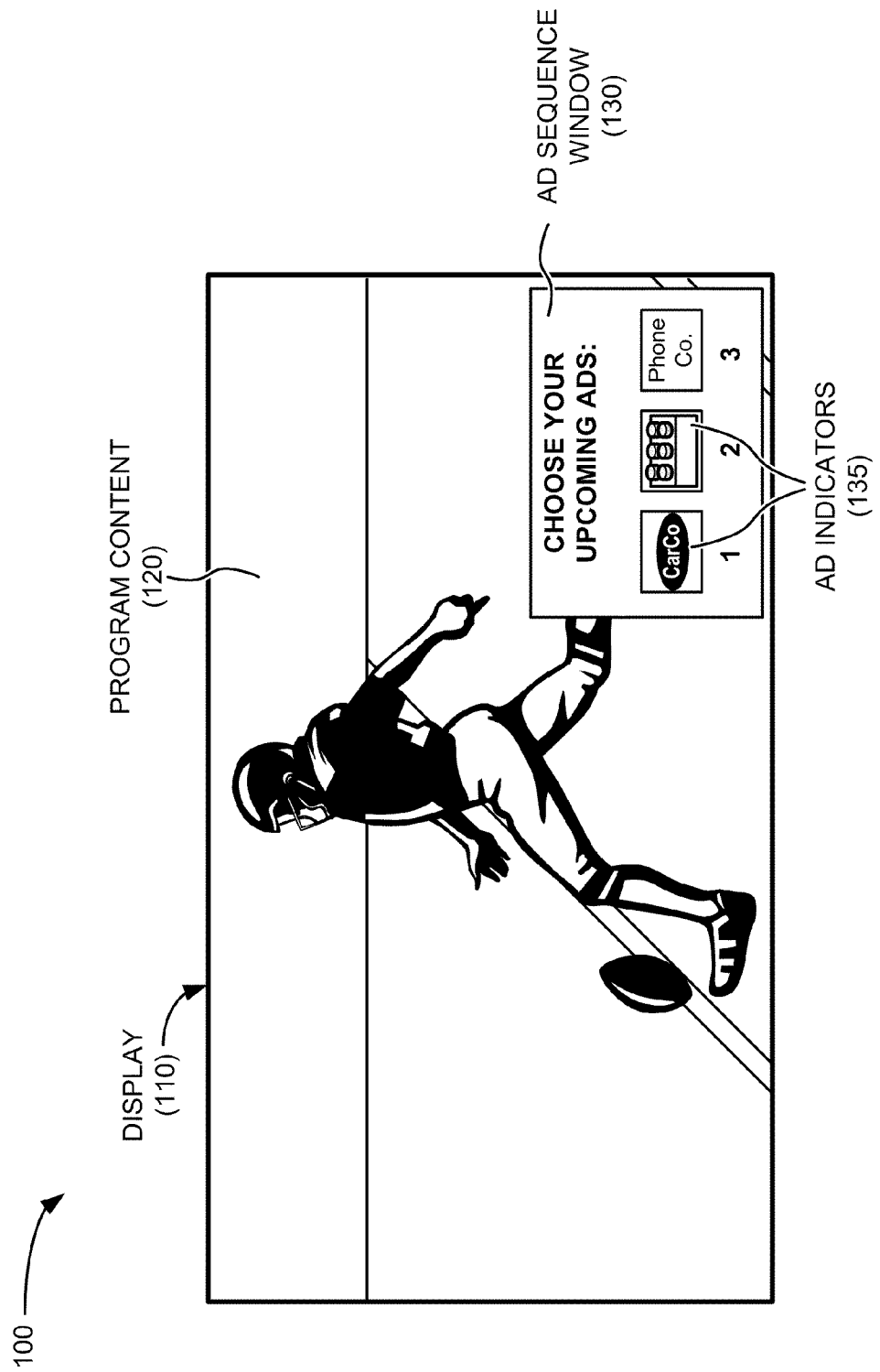
FIG. 1 illustrates an exemplary environment for presenting advanced notice of television advertising.

FIG. 1 illustrates an exemplary environment 100 for presenting advance notice of television advertising. As shown in FIG. 1, a display 110 may include program content 120 and an advertisement ("ad") sequence window 130. Program content 120 may include linear or interactive program content. Program content 120 may have a number of breaks during which one or more advertisements are shown. In one example, scheduled advertising breaks may be included for linear program content 120 based on particular time intervals. As another example, with interactive program content 120, one or more advertising breaks may be scheduled based on particular activities or user input.

Advertisement sequence window 130 may be presented during the presentation of program content 120 and in advance of an advertising break. Advertisement sequence window 130 may include an advertisement indicator 135 for each advertising timeslot within an upcoming advertising break. Advertisement sequence window 130 may provide an indication of scheduled advertisers for each timeslot of a forthcoming advertising break. In one implementation, advertisement indicators 135 may include a logo, an image, text, and/or another indicator of advertisers associated with each scheduled advertisement. In another implementation, advertisement indicators 135 may include static or dynamic thumbnails of the scheduled advertisements. According to implementations herein, some or all advertising timeslots within a scheduled advertising break may be filled according to viewer selections from a group of available advertisements. For example, a user may interact (e.g., via a remote control) with advertisement sequence window 130 to select different advertisement indicators 135 and/or to alter the sequence of advertisement indicators 135.

As used herein, the term "video client" may refer to any media processing device that may receive multimedia content over a network, and may provide such multimedia content to an attached video display device (such as a television or computer monitor). A "subscription multimedia service," as used herein, may refer to television, telephone, networking and/or other multimedia services provided to customers over a closed distribution network, such as cable, optical fiber, satellite, or virtual private networks. Also, as used herein, the terms "user," "viewer," "subscriber," and "customer" may refer interchangeably to a person who interacts with, orders, uploads, listens to, or plays multimedia content over a subscription multimedia service.

Figure 2:
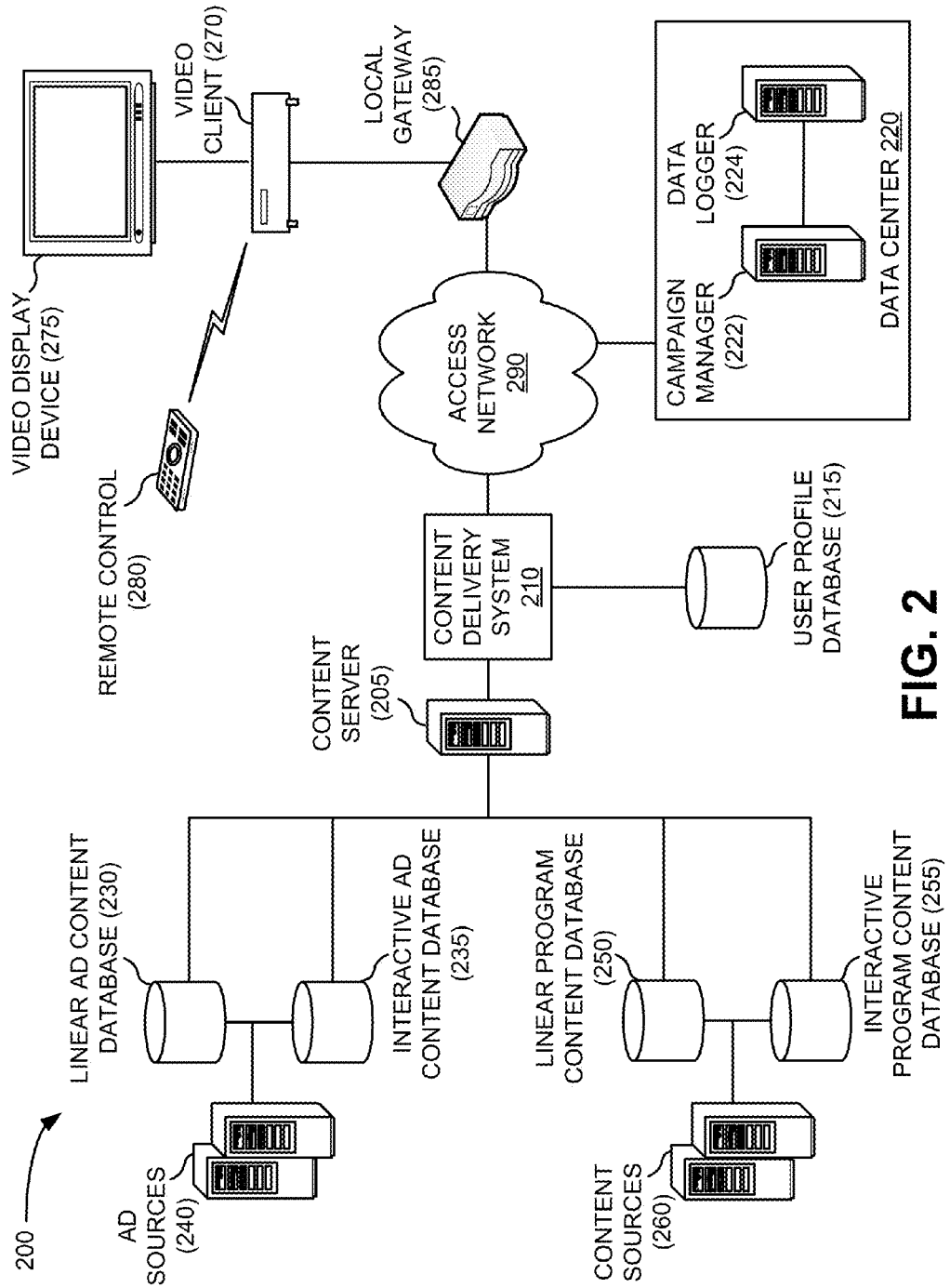
FIG. 2 depicts an exemplary network in which systems and/or methods described herein may be implemented.

FIG. 2 is a diagram of an exemplary network 200 in which systems and/or methods described herein may be implemented. As illustrated, network 200 may include a content server 205; a content delivery system 210; a user profile database 215; a data center 220 that includes a campaign manager 222 and a data logger 224; a linear advertising content database 230; an interactive advertising content database 235; advertising sources 240; a linear program content database 250; an interactive program content database 255, content sources 260, a video client 270, a video display device 275, a remote control 280, a local gateway 285, and an access network 290. Video client 270, video display device 275, remote control 280, and local gateway 285 may be located on a customer's premises and may be connected via access network 290 to content delivery system 210 and/or content server 205 located at, for example, a subscription multimedia service provider's premises. Components of network 200 may interconnect via wired and/or wireless connections.

For simplicity, one content server 205, one content delivery system 210, one user profile database 215, one data center 220, one campaign manager 222, one data logger 224, one linear advertising content database 230, one interactive advertising content database 235, one set of advertising sources 240, one linear program content database 250, one interactive program content database 255, one set of content sources 260, one video client 270, one video display device 275, one remote control 280, one local gateway 285, and one access network 290 have been illustrated in FIG. 2. In practice, there may be more content servers 205, content delivery systems 210, user profile databases 215, data centers 220, campaign managers 222, data loggers 224, linear advertising content databases 230, interactive advertising content databases 235, sets of advertising sources 240, linear program content databases 250, interactive program content databases 255, sets of content sources 260, video clients 270, video display devices 275, remote controls 280, local gateways 285, and access networks 290. Also, in some instances, one or more of the components of network 200 may perform one or more functions described as being performed by another one or more of the components of network 200.

Content server 205 may include one or more devices for providing content/information to video client 270 and/or video display device 275 in accordance with requests that are issued from video client 270. Examples of content server 205 may include a headend device that provides pay-per-view (PPV) events, a video-on-demand (VOD) device or another device that provides multimedia content upon request, an advertising server that provides advertising associated with multimedia content, and/or a program guide information server that provides information related to multimedia content available to video client 270. Content server 205 may communicate with a variety of other components within network 200, such as devices within content delivery system 210, linear advertising content database 230, interactive advertising content database 235, linear program content database 250, and interactive program content database 255 to provide requested multimedia services to customers. In one implementation, content server 205 may retrieve advertising content that has been specifically requested by video client 270 based on advertising schedules provided to video client 270. While shown as a single server device in FIG. 2, in other implementations, content server 205 may be distributed among multiple server devices.

Content delivery system 210 may include one or more devices to deliver broadcast and other multimedia content to video client 270. In general, content delivery system 210 may provide control over (e.g., via access network 290) television services for devices, such as video clients 270, video display devices 275, and/or other network connectivity devices (e.g., personal computers, not shown) provided at the customer's premises. Content delivery system 210 may include, for example, video hub offices (VHOs), databases, gateways, servers, network switches, and/or routers that may be connected by wired and/or wireless connections. Content delivery system 210 may serve as a link between a video client 270 and content server 205 to enable delivery of on-demand multimedia content, advertising, applications, etc. For example, content delivery system 210 may facilitate communications between content server 205 and video client 270 via access network 290. In one implementation, content delivery system 210 may combine broadcast programming content with advertising content (retrieved, e.g., from content server 205) to provide a combined linear content/advertising stream to video client 270. In some implementations, content delivery system 210 may also collect information from video clients 270 that may be used, for example, to generate user profiles.

User profile database 215 may include one or more devices for storing data for video client 270 or groups of video clients that may be used to provide targeted advertising. For example, advertisements may be assigned a unique advertising identifier that may be cross-referenced to particular demographics, interests, or other indicators that may be obtained from a user profiles. Advertisers may classify particular advertising content to identify demographic groups, common interests, and/or other information that can be used in determining particular video clients 270 (or groups of video clients) to which to direct the advertising content. Content delivery system 210 may retrieve user profile information from user profile database 215 and retrieve advertising content from content server 205 that has been classified to correspond to the user profile tendencies.

Data center 220 may include one or more devices that are capable of collecting data and performing statistical analysis on user activity of video client 270 and other video clients. Data center 220 may combine related data into groups of accounts based on, for example, pattern analysis and correlation. In implementations described herein, data center 220 may include campaign manger 222 and data logger 224.

Campaign manager 222 may include one or more server devices, or other types of computation or communication devices, that gather, process, search, and/or provide information in a manner described herein. Campaign manager 222 may receive notifications of user activity from video client 270 and may determine appropriate responses to the user activity. In one implementation, campaign manager 222 may access a dynamic set of advertising campaign rules, user profile information, and/or prevailing environmental/contextual metrics (e.g., time of day, program being viewed, etc.) that may be used to supplement advertising selected by a viewer. For example, campaign manager may identify viewer incentives (e.g., coupons, rebates, price reductions, etc.) when video client 270 indicates that a viewer has selected a particular advertisement or a particular category of advertisements.

Data logger 224 may include one or more devices that maintain a selection history (such as user selections/sequences of advertisements based on interactions with advertisement sequence window 130) of video client 270. In one implementation, data logger 224 may include a database of exemplary fields, such as a video client identifier, a user account identifier (e.g., for a particular user of a video client), a date field, a time field, one or more advertisement code(s) fields, and/or a program identification field (e.g., the current program at the time an advertisement sequence was selected). Data logger 224 may include multiple databases stored locally at data center 220 and/or stored at one or more different and possibly remote locations. Data logger 224 may group customers' selection histories, for example, by individual users, user groups, product type, etc. Information from data logger 224 may be retrieved by a backend server (or another server device) within, for example, content delivery system 210 to monitor advertising data, such as viewer response rates, revenue, etc.

Linear advertising content database 230 may include one or more devices that receive and maintain linear advertising content from advertising sources 240. Linear advertising content may include, for example, advertising content that may be inserted within a break in linear programming (e.g., a conventional commercial break in broadcast programming). Interactive advertising content database 235 may include one or more devices that receive and maintain interactive advertising content from advertising sources 240. Interactive advertising content may include, for example, non-linear advertising that may be presented, for example, based directly or indirectly on user input to video client 270. Non-liner advertising may include, for example, interactive applications, widgets, and/or other multimedia that may not be time-restricted.

Advertising sources 240 may include one or more server devices, or other types of computation or communication devices, that gather, process, search, and/or provide information in a manner described herein. Advertising sources 240 may provide linear and interactive advertising content to linear advertising content database 230 and/or interactive advertising content database 235. In an exemplary implementation, advertising sources 240 may be controlled by one or more different devices than the device that controls linear advertising content database 230 and/or interactive advertising content database 235 (e.g., the subscription multimedia service provider).

Linear program content database 250 and interactive program content database 255 may each include one or more devices that receive and maintain linear program content and interactive program content, respectively, from content sources 260. Linear program content may include, for example, video-on-demand programming. Interactive program content may include non-linear programming that may be selected and/or controlled by a user, such as interactive applications, games, etc.

Content sources 260 may include one or more server devices, or other types of computation or communication devices, that gather, process, search, and/or provide information in a manner described herein. Content sources 260 may provide linear and interactive program content to linear program content database 250 and/or interactive program content database 255. In an exemplary implementation, content sources 260 may be controlled by one or more different devices than the device that controls linear program content database 250 and/or interactive program content database 255 (e.g., the subscription multimedia service provider).

Video client 270 may include any device capable of receiving, transmitting and/or processing information to and/or from access network 290. In one implementation, video client 270 may be a closed device (e.g., including a hardware/software configuration that is not accessible to the general public). Video client 270 may provide video signals to video display device 275. Examples of video client 270 may include a set-top box, a computer, a cable card, and a portable electronic device. Video client 270 may receive a television signal from gateway 285, may convert the signal to a form usable by video display device 275, and may transmit the signal to video display device 275 for display. Video client 270 may further allow a user to provide user input for interactive television applications (e.g., to navigate menu displays, such as advertisement sequence window 130, and/or select menu items) and to alter the programming provided to video display device 275 based on a signal (e.g., a channel up or channel down signal) received from, for example, remote control 280. In one implementation, video client 270 may support interfaces, such as advertisement sequence window 130, using Enhanced TV Binary Interchange Format (EBIF). Video client 270 may also send data to a backend server (e.g., content server 205, campaign manager 222, and/or a device within content delivery system 210) via access network 290. In an exemplary implementation, video client 270 may also include an integrated digital video recorder (DVR) or other memory device that may enable video client 270 to store advertising content for later retrieval/presentation to a user based on, for example, user interactions with advertisement sequence window 130). In some implementations, video client 270 may be incorporated within video display device 275.

Video display device 275 may include a digital or analog display via which a user may view multimedia content (including, for example, conventional programming, interactive displays, and/or advertising). Video display device 275 may refer to any device that can receive and display multimedia content delivered over access network 290 and/or through video client 270 for perception by users. Video display device 275 may include technologies, such as cathode ray tube (CRT) displays, liquid crystal displays (LCDs), light-emitting diode (LED) displays, plasma displays, etc.

Remote control 280 may include a range of devices including function specific keys, number keys, and/or a full-text key pad. A user may interact with video client 270 using a keypad that is part of remote control 280, and signals representing key depressions may be transmitted to video client 270 via an infrared transmission or another type of transmission. Remote control 280 may allow a user to navigate a program guide, select channels or programs for viewing, adjust display characteristics, and/or perform other interactive functions related to viewing multimedia-type content provided over a network. In one implementation, video client 270 may allow a user to select advertisements from an advance listing of potential advertisements by using remote control 280. For example, arrow keys and a "Select" button on remote control 280 may be used to highlight and select indicators for particular advertisements. As another example, remote control 280 may include an "A," a "B," and a "C" shortcut button, where pressing each button may toggle between selected indicators and/or timeslots.

Local gateway 285 may include a network device that provides an interface from access network 290 to video clients 270 and/or other network connectivity devices (not shown). For example, when telecommunication services are provided to a customer's premises via an optical fiber, gateway 285 may include an optical network terminal (ONT) that connects to the optical fiber. The ONT may convert between signals appropriate for video display device 275 and signals appropriate for transmission over optical fiber. For example, the ONT may include a coaxial cable connection that leads to video display device 275 or video client 270. The ONT may also include an Ethernet output port that connects to a personal computer or a voice over Internet protocol (VoIP) telephone and/or a standard telephone port for connecting to a standard telephone. Gateway 285 may include one of a number of possible gateway devices, including a satellite antenna and receiver, a coaxial cable connection, an ONT, or a broadband access for Internet Protocol TV (IPTV). The satellite antenna and receiver may provide an interface for television services broadcast from satellites. The coaxial cable connection may provide an interface for television services connected to a customer via coaxial cables. The ONT may provide an interface for an optical fiber connection. The broadband IPTV access may generally include any device that provides broadband access over which television service may be provided.

Access network 290 may include a video signaling and distribution network and system that permit transfer of data between backend servers and video clients 270. Additionally, access network 290 may include, among other things, a firewall, a filtering mechanism, a proxy, and/or network address translation mechanisms. Access network 290 may include, for example, a single network, such as a wide area network (WAN), a local area network (LAN), a metropolitan area network (MAN), a telephone network (e.g., a public switched telephone network (PSTN) or a wireless network), the Internet, a satellite network, etc., or a combination of networks. Access network 290 may provide customers with multimedia content provided, for example, by content server 205 and/or content delivery system 210.

In implementations described herein, video client 270 may receive an advertising schedule, a list of available advertisements, and program content from content delivery system 210. The program content may include breaks for advertising. Based on the advertising schedule, video client 270 may present to the viewer a list of scheduled advertisements for an upcoming break. Video client 270 may also present an interactive menu (e.g., advertisement sequence window 130) and allow the viewer to alter the list of scheduled advertisement by selecting from a group of advertisements available for the break timeslot. In one implementation, video client 270 may pre-fetch some or all advertisements (e.g., from content server 205) that are available for selection in the upcoming break and store the advertisements in local memory. In another implementation, video client 270 may retrieve some or all of the selected (or default) advertisements in real time from content server 205/content delivery system 210. The advertisements selected by the viewer may then be presented during the next break in the program content. Video client 270 may also provide notifications of viewer selections to data center 220 via access network 290. As described further herein, the notifications of viewer selections may be used by data center 220 (or other components of the subscription multimedia service) to determine supplemental advertising for the viewer.

Figure 3:
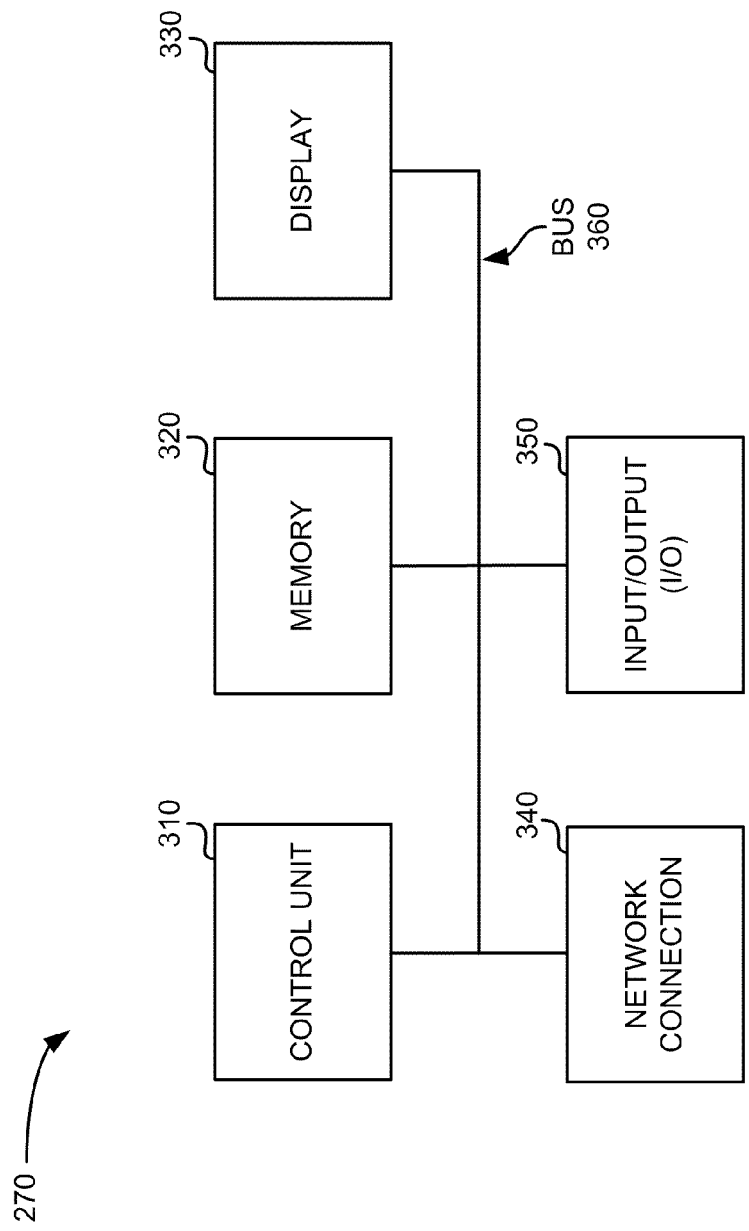
FIG. 3 is a block diagram of exemplary components of a video client that may be used in the network of FIG. 2.

FIG. 3 is diagram illustrating exemplary components of video client 270. As shown, video client 270 may include a control unit 310, a memory 320, a display 330, a network connection 340, an input/output (I/O) component 350, and a bus 360.

Control unit 310 may include one or more processors, microprocessors, or another type of processing logic that interprets and executes instructions. Among other functions, control unit 310 may execute instructions to present indictors of upcoming advertisements and receive viewer input to alter the scheduled list of advertisements. Control unit 310 may also collect and store viewer input associated with television programming/advertising. Control unit 310 may execute instructions to send viewer input to another device, such as campaign manager 222. Control unit 310 may also receive information and/or instructions from other devices, such as campaign manager 222 and/or content delivery system 210.

Memory 320 may include one or more dynamic or static storage devices that may store information and instructions for execution by control unit 310. For example, memory 320 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 320 may store a viewer activity log to send at a later point in time, such as when requested by campaign manager 222.

Display 330 may include any component capable of providing visual information. For example, in one implementation, display 330 may be a light emitting diode (LED) or a liquid crystal display (LCD). In another implementation, display 330 may use another display technology, such as a dot matrix display, etc. Display 330 may display, for example, text (such as a time, a date or a channel selection), images, and/or video information. Display 330 may be an optional component.

Network connection 340 may include any transceiver-like mechanism that enables video client 270 to communicate with other devices and/or systems, such as content server 205 and/or campaign manager 222. For example, network connection 340 may include an Ethernet interface, an optical interface, a coaxial interface, a radio interface, or the like. Network connection 340 may allow for wired and/or wireless communication. Network connection 340 may be configured to connect video client 270 to a packet-based IP network.

Input/output devices 350 may generally include user input devices such as external buttons, and output devices, such as LED indicators. With input/output devices 350, a user may generally interact with video client 270. In some implementations, input/output devices 350 may be implemented via a remote control (e.g., remote control 280). Bus 360 may provide an interface through which components of video client 270 can communicate with one another.

As will be described in detail below, video client 270 may perform certain operations relating to displaying information and communicating viewer activities to a server, such as campaign manager 222. Video client 270 may perform these operations in response to control unit 310 executing software instructions contained in a computer-readable medium, such as memory 320. A computer-readable medium may be defined as a physical or logical memory device. A logical memory device may refer to memory space within a single, physical memory device or spread across multiple, physical memory devices. The software instructions may be read into memory 320 from another computer-readable medium or from another device. The software instructions contained in memory 320 may cause control unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 illustrates exemplary components of video client 270, in other implementations, video client 270 may include fewer, different, differently arranged, or additional components than those depicted in FIG. 3. In still other implementations, one or more components of video client 270 may perform one or more other tasks described as being performed by one or more other components of video client 270.

Figure 4:
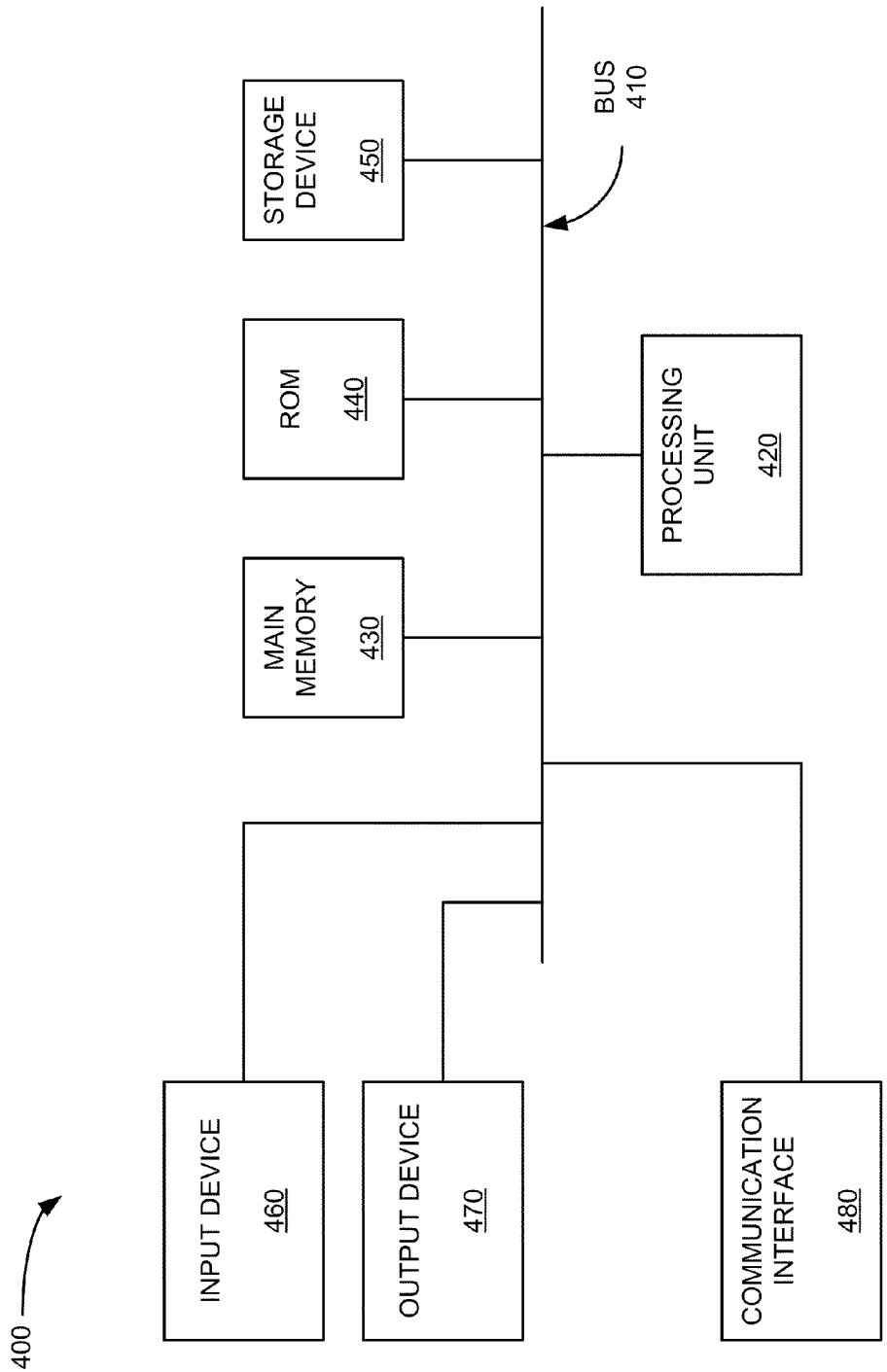
FIG. 4 is a block diagram of exemplary components of a device that may correspond to a content server and/or a campaign manager of FIG. 2.

FIG. 4 is a diagram of exemplary components of a device 400 that may correspond to content server 205 and/or campaign manager 222. In some implementations, device 400 may also correspond to one or more of data logger 224, advertising sources 240, content sources 260, and certain components of content delivery system 210. As illustrated, device 400 may include a bus 410, a processing unit 420, a main memory 430, a read-only memory (ROM) 440, a storage device 450, an input device 460, an output device 470, and a communication interface 480.

Bus 410 may include a path that permits communication among the components of device 400. Processing unit 420 may include one or more processors, microprocessors, or other types of processing units, such as application-specific integrated circuits (ASICs), field-programmable gate arrays (FPGAs), etc., that may interpret and execute instructions. Main memory 430 may include a RAM or another type of dynamic storage device that stores information and instructions for execution by processing unit 420. ROM 440 may include a ROM device or another type of static storage device that may store static information and instructions for use by processing unit 420. Storage device 450 may include a magnetic and/or optical recording medium and its corresponding drive. In one implementation, storage device may include a database. Storage device 450 may store viewer transaction history for particular video clients 270 or all video clients 270 associated with a subscription multimedia service provider.

Input device 460 may include a mechanism that permits an operator to input information to device 400, such as a keyboard, a mouse, a pen, voice recognition and/or biometric mechanisms, a touch-screen interface, etc. Output device 470 may include a mechanism that outputs information to the operator, including a display, a printer, a speaker, etc. Communication interface 480 may include any transceiver-like mechanism that enables device 400 to communicate with other devices and/or systems, such as video client 270.

As will be described in detail below, device 400 may perform certain operations associated with providing transactional advertising for a subscription television service. Device 400 may perform these and other operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 4 illustrates exemplary components of device 400, in other implementations, device 400 may include fewer, different, differently arranged, or additional components than those depicted in FIG. 4. In still other implementations, one or more components of device 400 may perform one or more other tasks described as being performed by one or more other components of device 400.

Figure 5:
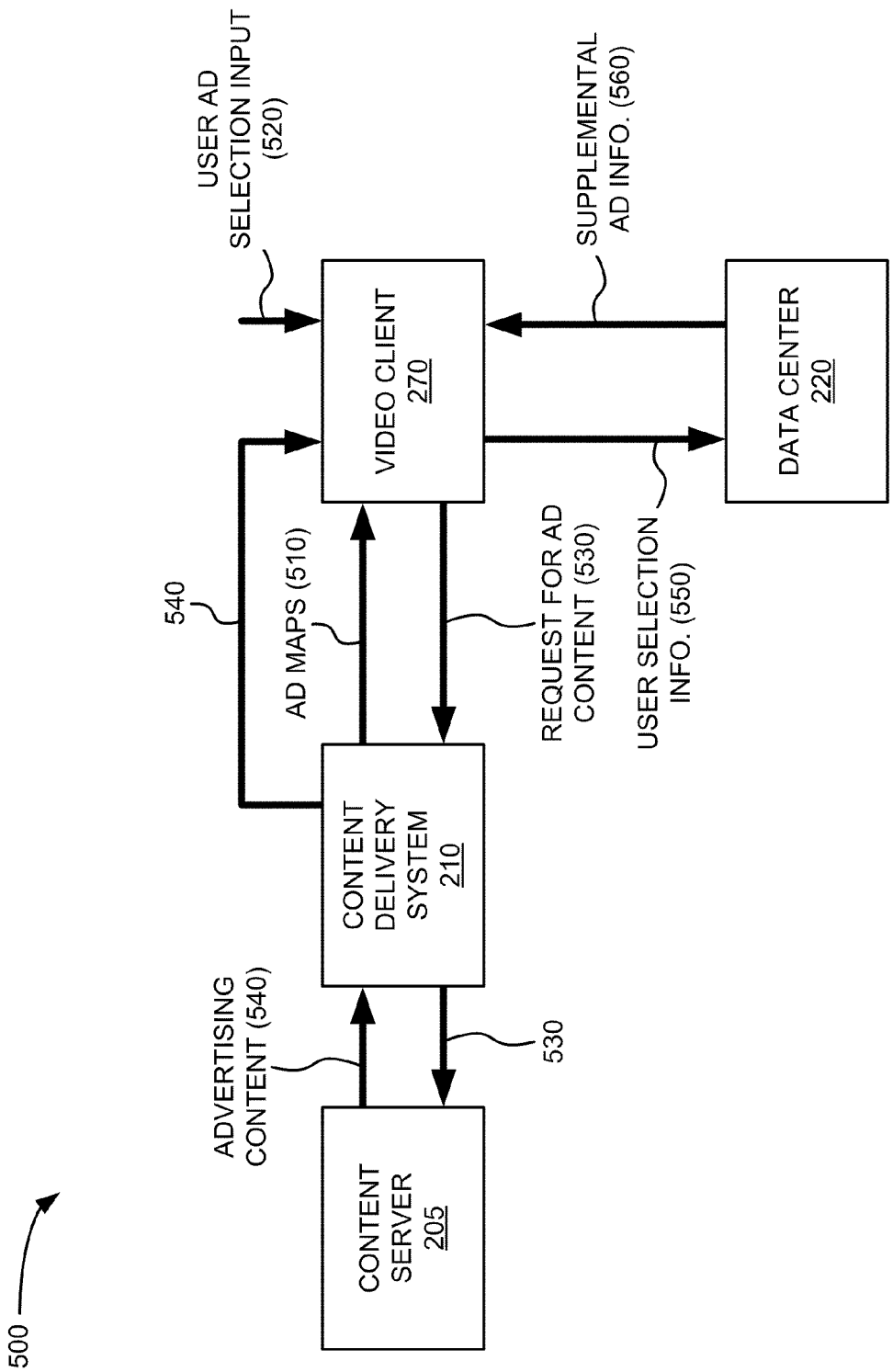
FIG. 5 depicts a diagram of exemplary interactions among components of an exemplary portion of the network illustrated in FIG. 2.

FIG. 5 depicts a diagram of exemplary interactions among components of an exemplary portion 500 of network 200. As illustrated, exemplary network portion 500 may include content server 205, content delivery system 210, data center 220, and video client 270. Content server 205, content delivery system 210, data center 220, and video client 270 may include the features described above in connection with, for example, FIG. 2.

As further shown in FIG. 5, content delivery system 210 may provide advertising ("ad") maps 510 to video client 270. Advertising maps 510 may include information regarding scheduled advertising for an upcoming period (e.g., 8 hours, 12 hours, 24 hours, etc.) and may be provided to video client 270 in advance of the particular upcoming period. Advertising maps 510 may provide advertising information for individual channels or groups of channels available through a subscription multimedia service. Advertising maps 510 may include information regarding, for example, a number of scheduled breaks within program content, a number (and/or duration) of timeslots for each scheduled break, restrictions/designations for each timeslot (e.g., requirements to use national vs. local advertisements and/or other types of advertisements), default advertisements for each break and/or timeslot, and/or available advertisements that may be selected to replace the default advertisement for each timeslot. In one implementation, advertising maps 510 may also include metadata for scheduled or available advertisements. The metadata may include, for example, text, images, and/or thumbnail videos for each available advertisement that may be used as advertising indicators (e.g., advertising indicators 135). As described further herein (e.g., with respect to FIG. 6), the metadata may also include descriptive information about each advertisement that may be presented to a viewer.

Using information from advertising maps 510, video client 270 may present to a viewer a list of scheduled advertisements for an upcoming break. Video client 270 may present (e.g., via video display device 275) the list of scheduled advertisements within an interactive menu (e.g., advertisement sequence window 130 or another menu format) that accepts user input to allow the viewer to alter the list of scheduled advertisements by selecting from a group of advertisements available for the upcoming break. Thus, video client 270 may receive a user advertisement selection input 520 via, for example, a remote control 280.

Based on user advertisement selection input 520, video client 270 may identify the user advertisement selections and associate the user selection with an identification code for the selected advertisements. Video client 270 may send a request 530 for the selected advertising content to content server 205 via content delivery system 210. Request 530 may include a request for the viewer's selected advertisements, which may include linear and/or interactive advertisements for presentation to the viewer.

In response to request 530 for advertising content, content server 205 may retrieve the requested advertising content 540 (e.g., from linear advertising content database 230 and/or interactive advertising content database 235) and provide the requested advertising content 540 to video client 270 via content delivery system 210. In one implementation, video client 270 may pre-fetch the selected advertising content 540 (e.g., via request 530) and store advertising content 540 locally (e.g., within memory 320) for retrieval at a subsequent break in program content.

Based on user advertisement selection input 520, video client 270 may also compile user selection information 550 to send to data center 220. User selection information 550 may include, for example, advertisement identification codes for the selected advertisements along with a video client identifier, a user account identifier, a date/time, and other contextual information that may be beneficial for monitoring viewer preferences and tailoring future advertising schemes.

Data center 220 may receive user selection information 550 and process the information in real time and/or at a later time. For example, campaign manager 222 within data center 220 may access a dynamic set of advertising campaign rules, user profile information, and/or prevailing environmental/contextual metrics (e.g., time of day, program being viewed, etc.) that may be used to supplement advertising selected by the viewer. Campaign manager 222 may also send the selection data to another location, such as data logger 224, for storage and later analysis.

Data center 220 may identify supplemental advertising information 560, such as viewer incentives (e.g., coupons, rebates, price reductions, etc.), based on the particular advertisement selected and/or the selection context. Data center 220 may provide supplemental advertising information 560 to video client 270. For example, campaign manager 222 may instruct video client 270 to pull additional advertising media (e.g., an interactive advertisement) from content server 205 for presentation to the viewer.

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

Figure 6:
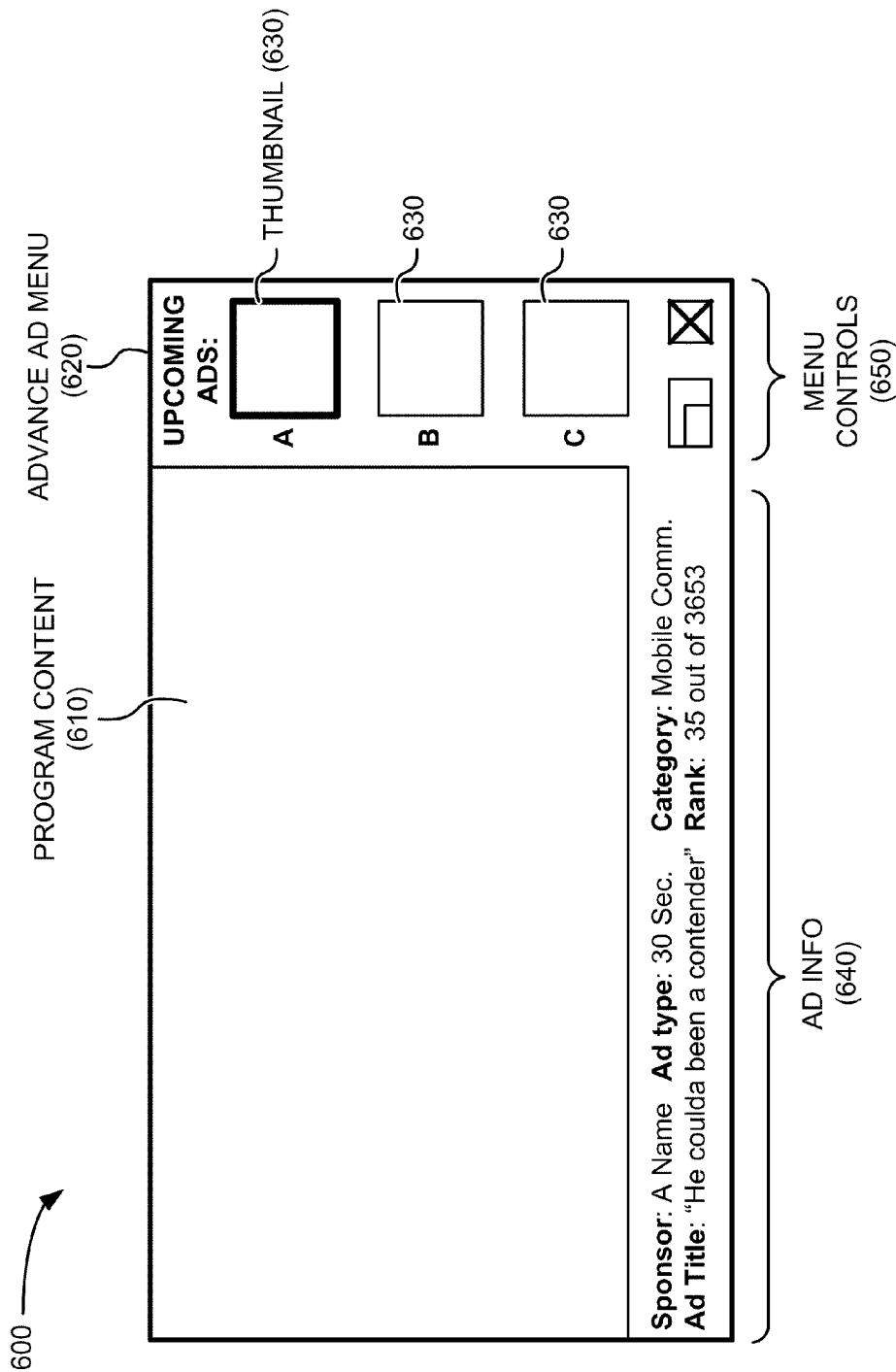
FIG. 6 illustrates a diagram of an exemplary on-screen display format including advanced notice of advertisements according to an implementation described herein.

FIG. 6 illustrates a diagram of an exemplary on-screen display format 600 including advanced notice of advertisements according to an implementation described herein. As shown in FIG. 6, display format 600 may include a program content section 610 and an advanced advertising menu 620.

Program content section 610 may include a display of linear or interactive program content that may include breaks in the program for advertisements. Program content section 610 may include, for example, a scaled portion of display 600 to accommodate advance advertising menu 620 or the full area of display 600 with advance advertising menu 620 overlaid thereon.

Advance advertising menu 620 may include thumbnails 630, an advertisement information section 640, and menu controls 650. In one implementation, advance advertising menu 620 may be automatically presented at a particular time interval (e.g., 60 seconds) before a scheduled program break. In other implementations, advance advertising menu 620 may be displayed at the request of a viewer (e.g., via a signal from remote control 280) or may be displayed whenever an advance advertisement mode is activated for video client 270.

Thumbnails 630 may include static or dynamic presentations of advertisements that are currently scheduled, for example, during the next program content break. The number of thumbnails may correspond to the number of advertising timeslots in the upcoming break, such that each thumbnail represents a particular timeslot. Thus, while three thumbnails 630 are shown in FIG. 6, there may be more or fewer thumbnails 630 displayed depending on the break format of the program content. In an exemplary implementation, a viewer may select a thumbnail 630 using an "A," "B," or "C" shortcut button on remote control 280 and may use arrow keys to scroll through thumbnails of other advertisements that may be available for that timeslot. While thumbnails 630 are described in the implementation of FIG. 6, in other implementations different indicators (e.g., text, sponsor logos, etc.) may be used to represent advertising selections.

Advertisement information section 640 may include information (e.g., metadata) regarding a particular advertisement and/or thumbnail 630 that may be currently highlighted by a viewer. For example, using an "A" shortcut button on remote control 280 may cause the thumbnail 630 corresponding to timeslot "A" to be highlighted, as shown in FIG. 6. Metadata associated with the currently highlighted thumbnail 630 may then be displayed. Advertisement information may include, for example, a sponsor/advertiser name, an advertisement type (e.g., a linear time or interactive), a category, a date, a product type/name, an advertisement title, a popularity ranking, etc. In the example of FIG. 6, the thumbnail 630 for timeslot "A" may correspond to the sponsor ("A Name"), ad type ("30 seconds"), category ("Mobile Communications"), ad title ("He coulda been a contender"), and popularity rank (e.g., "35 out of 3653") shown in advertisement information section 640.

Menu controls 650 may include, for example, command icons that may be selected to alter the presentation of advance advertising menu 620. Menu controls 650 may include options to close, reduce, or enlarge the size of advance advertising menu 620. In other implementations, menu controls 650 may also include options to alter the presentation format of advance advertising menu 620. For example, video client 270 may include multiple menu formats for presenting advance notice and selecting advertisements so that a viewer may select a preferred menu format. Exemplary menu formats may include advertisement sequence window 130, advance advertisement menu 620, and other menu presentations disclosed herein.

Although FIG. 6 shows exemplary sections and menu selections of display format 600, in other implementations, display format 600 may contain fewer, different, differently arranged, or additional sections and menu selections than depicted in FIG. 6.

Figure 7:
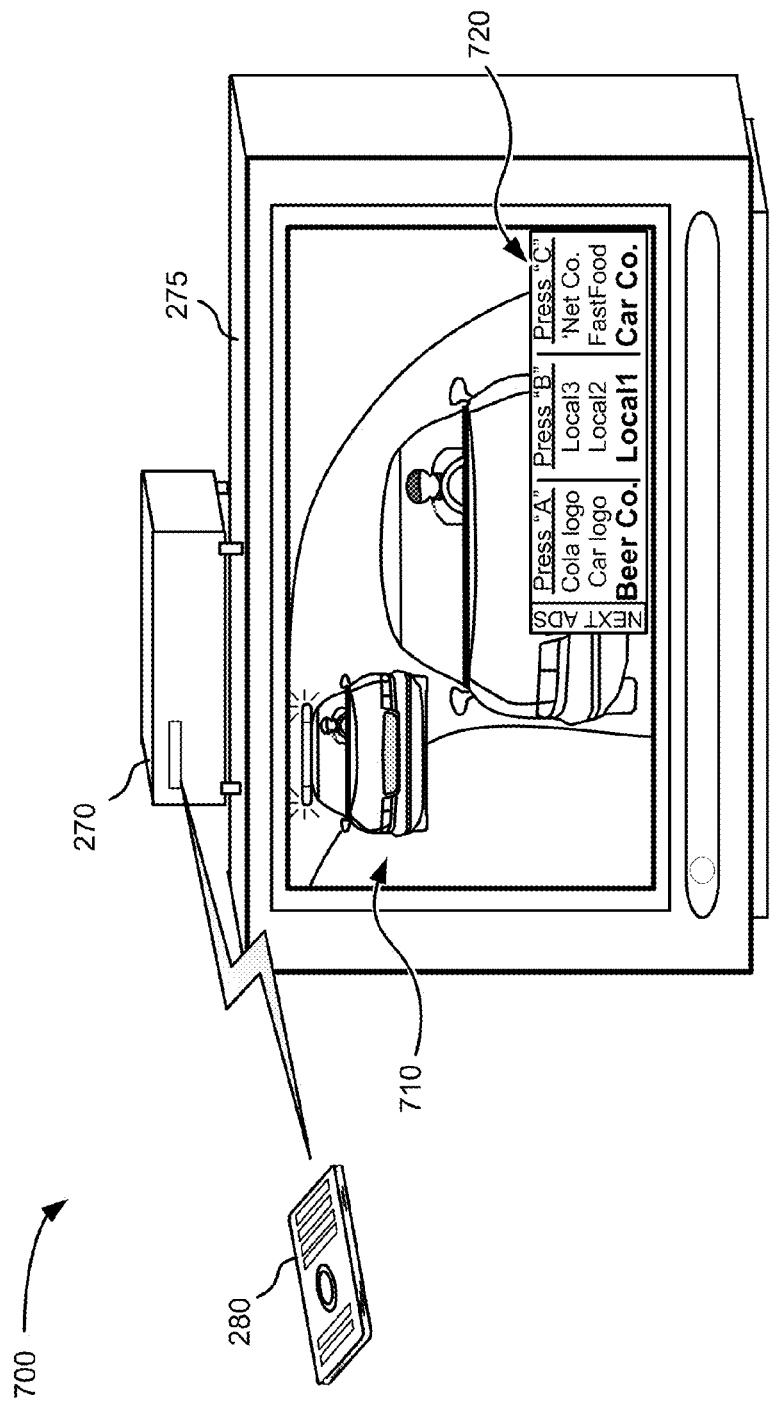
FIGS. 7 and 8 are exemplary diagrams illustrating implementations of a user interface for advanced notice of advertisements.
Figure 8:
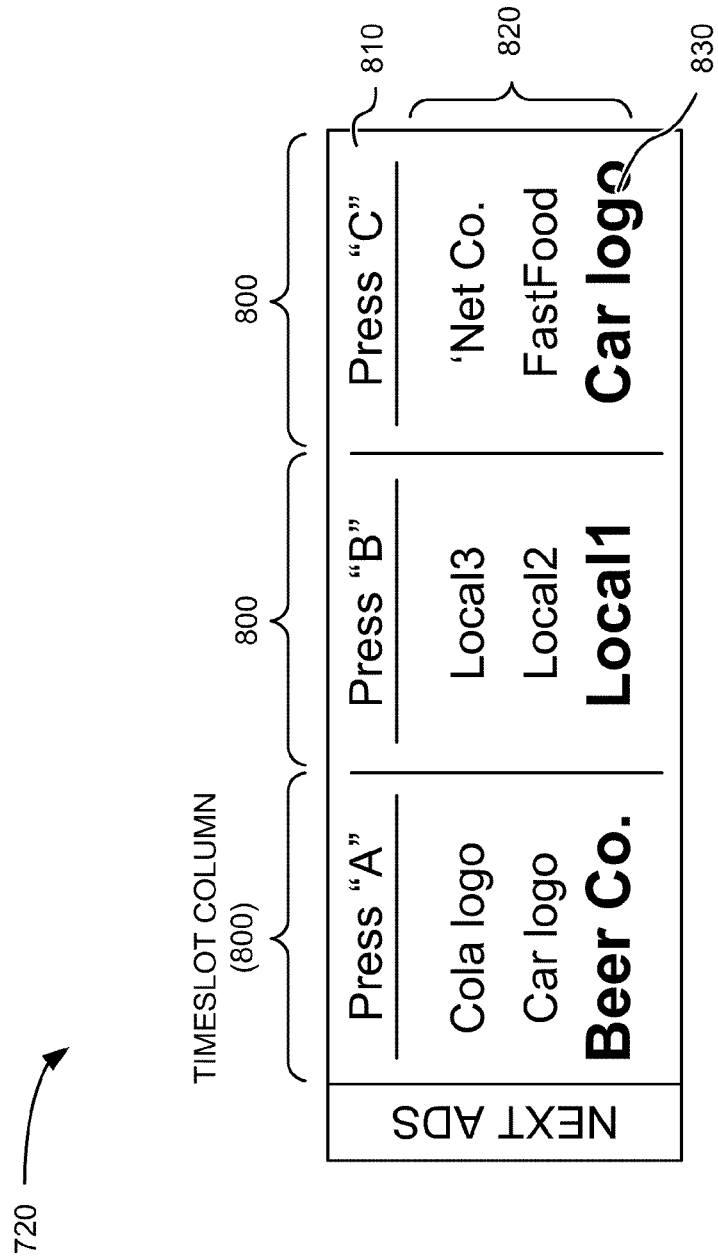

FIGS. 7 and 8 provide exemplary diagrams illustrating implementations of a user interface for advance notice and scheduling of advertisements. More specifically, FIG. 7 provides an exemplary diagram of an environment 700 implementing an on-screen display that includes an advance advertisement menu 720, and FIG. 8 provides an enlarged view of the advance advertisement menu 720.

Referring to FIG. 7, a viewer may view program content 710 on video display device 275. While the viewer is watching program content 710, video client 270 may cause advance advertisement menu 720 to appear as a "pop-up" menu on video display device 275 at a particular time interval prior to a break in program content 710. Advance advertisement menu 720 may indicate a default set of advertisements that is scheduled for the upcoming break and potential other advertisements that may be selected. While the program content 710 continues to be displayed, a user may manipulate (e.g., via remote control 280) the advertising schedule presented in advance advertisement menu 720. Advance advertisement menu 720 is described in more detail with respect to FIG. 8.

Referring to FIG. 8, advance advertisement menu 720 may include a timeslot column 800 for each advertising segment scheduled within the break in programming content 710. Thus, in the example of FIG. 8, three advertising segments may be scheduled. Each timeslot column 800 may include a timeslot identifier 810 and one or more advertisement indicators 820 that include a current/default advertisement indicator 830. Timeslot column 800 may provide an indication of an advertising timeslot so that only advertisement indicators 820 assigned to a particular timeslot may be selected. For example, selection of advertisement indicators 820 may be limited to national advertisements in one of timeslot columns 800 and limited to local advertisements in another of timeslot columns 800. As another example, a premium advertisement cost may be associated with a particular (e.g., first) timeslot within an advertising break, such that only advertisers paying the premium cost may have advertisement indicators 820 within a particular (e.g., first) timeslot column 800.

Timeslot identifier 810 may include an indication of the sequence (e.g., first, second, third, etc.) for each timeslot column 800 within a programming break and/or instructions for navigating to/within each timeslot column 800. For example, in the configuration of FIG. 8, a viewer may press "A," "B," or "C" on remote control 280 to select a particular timeslot column 800, and then use an up/down arrow key on remote control 280 to select a particular advertisement indicators 820 (e.g., current/default advertisement indicator 830) within that timeslot column 800. As another example, simply pressing "A," "B," or "C" on remote control 280 may cause advertisement indicators 820 within an associated timeslot column 800 to incrementally scroll to a next position or to scroll to a pseudo-random position (similar to a slot-machine wheel).

Advertisement indicators 820 may include static or dynamic thumbnails of advertisements, a logo, an image, text, and/or another indicator of an advertiser associated with a scheduled advertisement. In the exemplary implementation of FIG. 8, unselected advertisement indicators 820 for each timeslot column 800 may be shown. Thus, current/default advertisement indicator 830 may be designated by some form of highlighting or technique to differentiate current/default advertisement indicator 830 from other advertisement indicators 820. In other implementations, only current/default advertisement indicator 830 may be visible within each timeslot column 800.

Although FIG. 8 shows exemplary sections and menu selections of advance advertisement menu 720, in other implementations, advance advertisement menu 720 may contain fewer, different, differently arranged, or additional sections and menu selections than depicted in FIG. 8.

Figure 9:
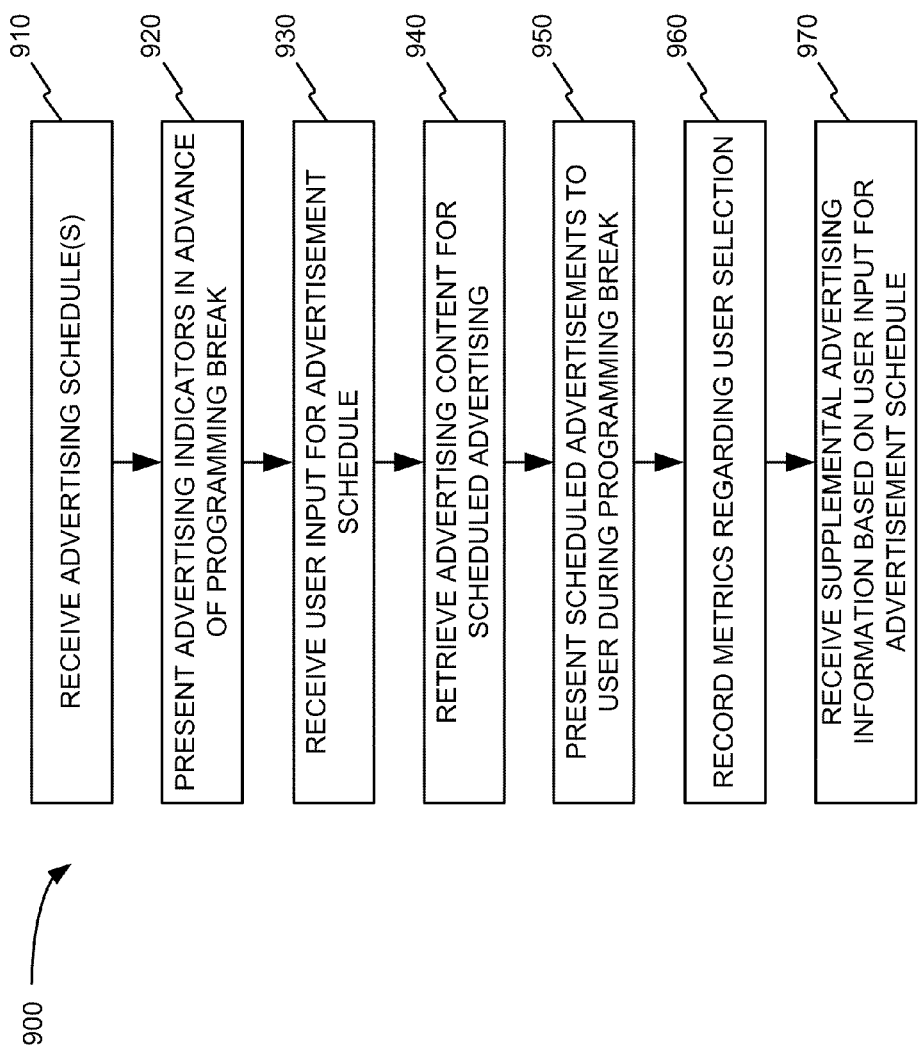
FIG. 9 is a flow chart illustrating an exemplary process for providing advanced notice of advertisements.

FIG. 9 provides a flow chart of an exemplary process 900 for providing advanced notice of advertisements. Some or all of process 900 may be performed by a video client associated with a subscription multimedia service, such as video client 270. In some implementations, some or all of process 900 may be performed by video client 270 in conjunction with one or more other components of network 200, such as content server 205, content delivery system 210, and/or data center 220.

Process 900 may include receiving advertising schedules (block 910). For example, as described above in connection with FIG. 5, video client 270 may receive one or more advertising maps 510 from content delivery system 210. Advertising maps 510 may include information regarding scheduled advertising for an upcoming period (e.g., 8 hours, 12 hours, 24 hours, etc.) and may be provided to video client 270 in advance of the particular upcoming period. Advertising maps 510 may include, for example, a number of schedule breaks/timeslots within program content, national and/or local advertisement schedules, default advertisements for each break and/or timeslot, and available advertisements that may be selected to replace the default advertisement for each timeslot.

Advertising indicators may be presented in advance of a programming break (block 920). For example, as described above in connection with FIG. 5, video client 270 may use information from advertising maps 510 to present to a viewer a list of scheduled advertisements for an upcoming break. Video client 270 may present (e.g., via video display device 275) the list of scheduled advertisements within an interactive menu (e.g., advertisement sequence window 130, advance advertising menu 620, advance advertising menu 720, etc.) that accepts user input to allow the viewer to alter the list of scheduled advertisements by selecting from a group of advertisements available for the upcoming break. In one implementation, a viewer may select between multiple interactive menu formats that may be used to present advertising indicators.

Returning to FIG. 9, user input for the advertisement schedule may be received (block 930) and advertising content for the scheduled advertising may be received (block 940). For example, as described above in connection with FIG. 5, video client 270 may receive a user advertisement selection input 520 via, for example, a remote control 280. Based on user advertisement selection input 520, video client 270 may identify the user advertisement selections and associate the user selection with an identification code for the selected advertisements. To retrieve advertising content for the schedule advertising, video client 270 may send a request 530 for the selected advertising content to content server 205 via content delivery system 210. Request 530 may include a pull request for the viewer's selected advertisements, which may include, for example, linear and/or interactive advertisements.

The scheduled advertisements may be presented to the user during the programming break (block 950). For example, video client 270 may cause video display device 275 to present, during the next programming break, the advertisements previously selected by the viewer.

Metrics regarding the user selection may be recorded (block 960). For example, as described above in connection with FIG. 5, based on user advertisement selection input 520, video client 270 may compile user selection information 550 to send to data center 220. User selection information 550 may include, for example, advertisement identification codes for the selected advertisements along with a video client identifier, a user account identifier, a date/time, and other contextual information that may be beneficial for monitoring viewer preferences and tailoring future advertising schemes. In one implementation, the compiled metrics may be stored locally at video client 270 and sent to data center 220 at periodic intervals and/or when requested by data center 220. In another implementation, the compiled metrics may be sent from video client 270 to data center 220 as events occur, and the compiled metrics may be stored at data center 220 (e.g., data logger 224).

Supplemental advertising information based on the user input for the advertisement schedule may be received (block 970). For example, as described above in connection with FIG. 5, campaign manager 222 (within data center 220) may access a dynamic set of advertising campaign rules, user profile information, and/or prevailing environmental/contextual metrics (e.g., time of day, program being viewed, etc.) that may be used to supplement advertising selected by the viewer. Data center 220 may identify viewer incentives (e.g., coupons, rebates, price reductions, etc.) based on the particular advertisement selected by the viewer and/or the selection context. Data center 220 may provide supplemental advertising information 560 to video client 270. For example, campaign manager 222 may instruct video client 270 to pull additional advertising media (e.g., an interactive advertisement) from content server 205 for presentation to the viewer.

Figure 10:
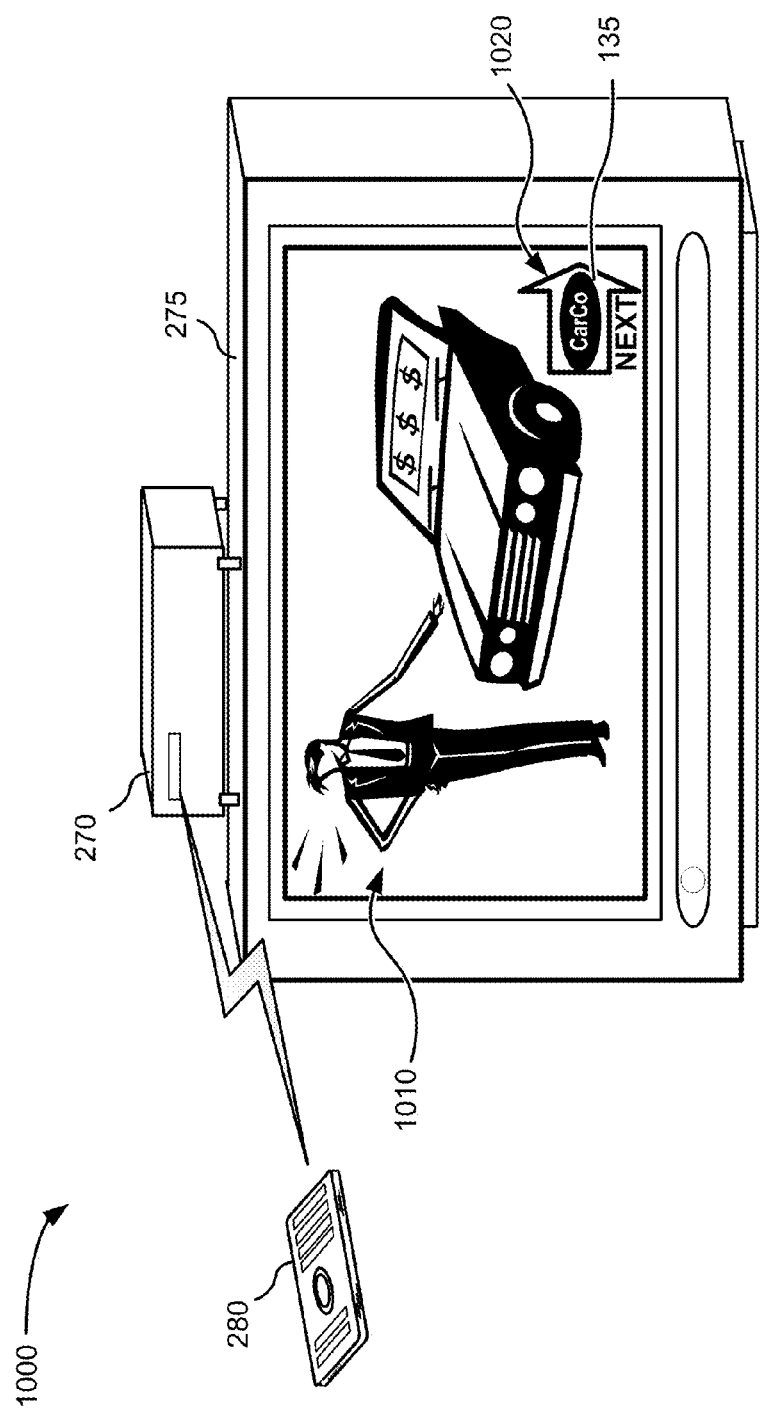
FIG. 10 provides an exemplary diagram of another user interface according to an implementation described herein.

FIG. 10 provides an exemplary diagram of another user interface 1000 according to an implementation described herein. In the implementation of FIG. 10, a viewer may opt out of advance advertising notification, and may instead select advertisements in real time during a programming break. For example, a viewer may begin watching a scheduled default advertisement 1010 and then selectively "skip" or "advance" to a next available advertisement providing input to an advertisement selection menu 1020 via remote control 280.

Advertisement selection menu 1020 may be presented during a programming break and may include a selectable image/option to advance to a next advertisement. In one implementation, advertisement selection menu 1020 may also include an indication of an advertiser associated with the next available advertisement by including an advertising indicator (e.g., advertising indicator 135). Viewer input to advertisement selection menu 1020 may trigger video client 270 to retrieve a next available advertisement as indicated by, for example, advertising map 510. In one implementation, video client 270 may provide a request for advertising content (e.g., request 530) each time a viewer provides input to advertisement selection menu 1020. In another implementation, video client may pre-fetch, from content server 205, advertising content for all available advertisement options in advance of a particular programming break. With such real time selection one viewer can, for example, spend a 45-second break passively watching three 15-second default advertisements, while another viewer using the advanced advertisement notice feature on a different video client 270/video display device 275 may spend the same 45-second break actively skimming a second or two of a large number of available advertisements.

Implementations described herein may provide systems and/or methods that receive an advertising map over a subscription multimedia network, where the advertising map includes a schedule of default advertisements during a programming break and indications of available alternate advertisements. The systems and/or methods also present to a user, on a display, indicators for the schedule of default advertisements and receive user input to alter the schedule of default advertisements. The systems and/or methods further retrieve advertising content for the altered schedule and present, on the display and during the programming break, the advertising content for the altered schedule.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while a series of blocks has been described with regard to the flowchart of FIG. 9, the order of the blocks may differ in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    causing, by a client device, a menu to be presented at a particular period of time before a programming break,
        the menu being presented concurrently with presentation of programming content associated with the programming break,
        the menu including:
            a first portion for a first timeslot of the programming break, and
            a second portion for a second timeslot of the programming break
        the first portion including:
            a first indicator associated with a first default advertisement for the first timeslot of the programming break, and
            a second indicator associated with a first alternate advertisement for the first timeslot of the programming break, and
        the second portion including:
            a third indicator associated with a second default advertisement for the second timeslot of the programming break, and
            a fourth indicator associated with a second alternate advertisement for the second timeslot of the programming break;
    receiving, by the client device, an input to replace the first default advertisement with the first alternate advertisement;
    creating, by the client device, an altered schedule based on the input; and
    providing, by the client device and during the first timeslot of the programming break, the first alternate advertisement based on the altered schedule.

2. The method of claim 1, further comprising:
    sending, to a server, a notification of the input; and
    receiving, based on the notification, the first alternate advertisement for presentation to the user.

3. The method of claim 1, further comprising:
    receiving an advertising map that includes one or more of:
        an indication of a number of scheduled breaks within the programming content,
            the scheduled breaks including the programming break,
        an indication of a number of timeslots within each one of the scheduled breaks,
            the timeslots including the first timeslot and the second timeslot, or
        information regarding durations of the timeslots.

4. The method of claim 3, where the first indicator includes one or more of:
    an image corresponding to the first default advertisement,
    a thumbnail video corresponding to the first default advertisement, or
    descriptive information corresponding to the first default advertisement.

5. The method of claim 1, where the input is received during the programming break.

6. The method of claim 1, further comprising:
    receiving an advertising map that includes information regarding the first default advertisement, the second default advertisement, the first alternate advertisement, and the second alternate advertisement,
        the menu being based on the advertising map.

7. A system comprising:
    a processor to:
        cause a menu to be presented at a particular period of time before a break of programming content,
            the menu being presented concurrently with presentation of programming content associated with the break,
            the menu including:
                a first portion for a first timeslot of the break, and
                a second portion for a second timeslot of the break,
            the first portion including:
                a first indicator associated with a first default advertisement for first timeslot of the break, and
                a second indicator associated with a first alternative advertisement for the first timeslot of the break, and
            the second portion including:
                a third indicator associated with a second default advertisement for the second timeslot of the break, and
                a fourth indicator associated with a second alternative advertisement for the second timeslot of the break;
        receive input to replace the first default advertisement, with the first alternative advertisement;
        create an altered schedule based on the input; and
        provide, for presentation and during first timeslot of the break, the first alternative advertisement based on the altered schedule.

8. The system of claim 7, where the first indicator includes one or more of:
an image corresponding to the first default advertisement,
a thumbnail video corresponding to the first default advertisement, or
descriptive information corresponding to the first default advertisement.

9. The system of claim 7, where the processor is further to:
receive, before causing the menu to be presented, advertising schedule information that includes information indicating one or more of:
a number of scheduled breaks within the programming content,
the scheduled breaks including the break,
a number of timeslots within each one of the scheduled breaks,
the timeslots including the first timeslot and the second timeslot, or
information regarding durations of the timeslots.

10. The system of claim 8, where the processor is further to:
provide information regarding the input to a server,
receive information regarding a supplemental advertisement from the server, and
provide, for presentation, the supplemental advertisement.

11. The system of claim 7, where the processor is further to:
receive an advertising map that includes information regarding the first default advertisement, the second default advertisement, the first alternate advertisement, and the second alternate advertisement,
the menu being based on the advertising map.

12. A method comprising:
sending, by one or more devices and to a video client, an advertising map that includes information to be provided, for presentation, by the client device in a menu at a particular period of time before a programming break and concurrently with presentation of programming content associated with the programming break,
the menu including:
a first portion for a first timeslot of the programming break, and
a second portion for a second timeslot of the programming break,
the first portion including:
a first indicator associated with a first default advertisement for the first timeslot of the programming break, and
a second indicator associated with a first alternative advertisement for the first timeslot of the programming break, and
the second portion including:
a third indicator associated with a second default advertisement for the second timeslot of the programming break, and
a fourth indicator associated with a second alternative advertisement for the second timeslot of the programming break;
receiving, by the one or more devices, a notification that a user has selected to replace the first default advertisement with the first alternative advertisement; and
sending, by one of the one or more devices and to the video client, the first alternative advertisement based on the notification.

13. The method of claim 12, further comprising:
storing metrics regarding the user selecting the first alternative advertisement.

14. The method of claim 12, where the advertising map further includes one or more of:
an indication of a number of scheduled breaks within the programming content,
the scheduled breaks including the programming break,
an indication of a number of timeslots within each one of the scheduled breaks,
the timeslots including the first timeslot and the second timeslot, or
information regarding durations of the timeslots.

15. The method of claim 12, further comprising:
determining supplemental advertising content to be presented to based one or more of:
a dynamic set of advertising campaign rules associated with the supplemental advertising content, or
a user profile associated with the video client, and
sending, to the video client, information regarding the supplemental advertising content.

16. The method of claim 12, where the first indicator includes one or more of:
an image corresponding to the first default advertisement,
a video corresponding to the first default advertisement, or
descriptive information corresponding to the first default advertisement.

17. A system comprising:
one or more processors to:
send, to a device, information to be provided, for presentation, by the device in a menu at a particular period of time before a programming break and concurrently with presentation of programming content associated with the programming break,
the menu including:
a first portion for a first timeslot of the programming break, and
a second portion for a second timeslot of the programming break,
the first portion including:
a first indicator associated with a first default advertisement for a first timeslot of the programming break, and
a second indicator associated with a first alternative advertisement for the first timeslot of the programming break, and
the second portion including:
a third indicator associated with a second default advertisement for the second timeslot of the programming break, and
a fourth indicator associated with a second alternative advertisement for the second timeslot of the programming break;
receive, from the device, a request indicating a selection to replace the first default advertisement with the first alternative advertisements; and
send, to the device and based on the request, the first alternative advertisement to be presented by the device during the first timeslot.

18. The system of claim 17, where the information comprises:
an indication of a number of scheduled breaks within the programming content,
the scheduled breaks including the programming break,
an indication of a number of timeslots within each one of the scheduled breaks,
the timeslots including the first timeslot and the second timeslot, and
information regarding durations of the timeslots.

19. The system of claim 17, where the one or more processors are further to:

determine supplemental advertising content to be presented to a user; and send, to the device, instructions to retrieve the supplemental advertising content for presentation to the user.

20. The system of claim 17, where the first indicator includes one or more of:

an image corresponding to the first default advertisement,
a video corresponding to the first default advertisement, or
descriptive information corresponding to the first default advertisement.

21. A non-transitory computer-readable medium storing instructions, the instructions comprising:

one or more instructions that, when executed by at least one processor, cause the at least one processor to:

provide, for presentation, a menu at a particular period of time before a break in program content and concurrently with presentation of the program content, the menu including:
a first portion for a first timeslot of the break, and
a second portion for a second timeslot of the break,
the first portion including:
a first indicator associated with a first default advertisement for the first timeslot of the break, and
a second indicator associated with a first alternative advertisement for the first timeslot of the break, and the second portion including:
a third indicator associated with a second default advertisement for the second timeslot of the break, and
a fourth indicator associated with a second alternative advertisement for the second timeslot of the break;

receive an input to replace the first default advertisement with the first alternative advertisement; and cause, based on the input, the first alternative advertisement to be presented during the first timeslot of the break.

22. The non-transitory computer-readable medium of claim 21, where the instructions further comprise:

one or more instructions that, when executed by the at least one processor, cause the at least one processor to:
store metrics regarding the input.

23. The non-transitory computer-readable medium of claim 21, where the first indicator includes one or more of:

an image corresponding to the first default advertisement,
a video corresponding to the first default advertisement, or
descriptive information corresponding to the first default advertisement.

* * * * *